United States Patent
Song et al.

(10) Patent No.: US 7,480,958 B2
(45) Date of Patent: *Jan. 27, 2009

(54) ROBOT CLEANER, ROBOT CLEANING SYSTEM AND METHOD OF CONTROLLING SAME

(75) Inventors: Jeong-gon Song, Gwangju (KR); Kyoung-mu Lee, Seoul (KR); Seung-bin Moon, Seoul (KR); Sang-yong Lee, Gwangju (KR); Jang-youn Ko, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 903 days.

This patent is subject to a terminal disclaimer.

(21) Appl. No.: 10/400,651

(22) Filed: Mar. 28, 2003

(65) Prior Publication Data

US 2004/0016077 A1 Jan. 29, 2004

(30) Foreign Application Priority Data

Jul. 26, 2002 (KR) .......................... 2002-0044346

(51) Int. Cl.
*A47L 5/00* (2006.01)

(52) U.S. Cl. .................. 15/319; 15/340.1; 180/168; 348/119; 701/211; 700/259

(58) Field of Classification Search .............. 15/319, 15/340.1; 180/167–169; 348/119; 701/28, 701/207–224; 700/259, 207–224; *G06K 9/22; G06F 15/50; A47L 5/00*

See application file for complete search history.

(56) References Cited

U.S. PATENT DOCUMENTS

| 3,738,443 | A | 6/1973 | Kubo |
| 4,947,094 | A | 8/1990 | Dryer et al. |
| 5,051,906 | A | 9/1991 | Evans et al. |
| 5,525,883 | A * | 6/1996 | Avitzour ..................... 318/587 |
| 5,995,884 | A | 11/1999 | Allen et al. |
| 6,349,249 | B1 | 2/2002 | Cunningham |
| 6,496,754 | B2 * | 12/2002 | Song et al. .................. 700/245 |
| 6,597,143 | B2 * | 7/2003 | Song et al. .................. 318/581 |
| 6,732,826 | B2 | 5/2004 | Song et al. |
| 2002/0091466 | A1 | 7/2002 | Song et al. |

FOREIGN PATENT DOCUMENTS

| CN | 1354073 A | 6/2002 |
| DE | 4429106 A1 | 2/1996 |

(Continued)

*Primary Examiner*—David A Redding
(74) *Attorney, Agent, or Firm*—Plumsea Law Group, LLC

(57) ABSTRACT

A robot cleaner includes a drive unit for driving a plurality of wheels, a camera disposed in a body for photographing an upper image extending perpendicular to a running direction, a controller for recognizing a position by using position information obtained from a recognition mark formed on a ceiling of a working area that is photographed by the camera, and controlling the drive unit by using the recognized position information to correspond to a target cleaning operation. Accordingly, since the recognition mark for the recognition of a current position of the robot cleaner is formed on a ceiling that has a few changes, the position recognition is performed with more accuracy and the traveling of the robot cleaner to the target work area and a cleaning operation is performed efficiently.

10 Claims, 6 Drawing Sheets

FOREIGN PATENT DOCUMENTS

| | | |
|---|---|---|
| DE | 10 13 3006 | 5/2002 |
| DE | 10 14 5150 | 5/2002 |
| DE | 10 16 4278 | 10/2002 |
| EP | 363 339 A2 | 4/1990 |
| EP | 0364353 A1 | 4/1990 |
| EP | 0366350 A2 | 5/1990 |
| GB | 2369511 A | 5/2002 |
| GB | 2376537 A | 12/2002 |
| GB | 2382251 A | 5/2003 |
| JP | 10-23860 A | 9/1989 |
| JP | 01243104 A | 9/1989 |
| JP | 03-242711 | 10/1991 |
| JP | 10-177414 A | 6/1998 |
| JP | 100177414 A | 6/1998 |
| JP | 110259659 A | 9/1999 |
| JP | 2002-182742 | 6/2002 |
| WO | WO 01/37060 A1 | 5/2001 |

* cited by examiner

ROBOT CLEANER, ROBOT CLEANING SYSTEM AND METHOD OF CONTROLLING SAME

FIELD OF THE INVENTION

The present invention relates to a robot cleaner, a robot cleaning system, and a method of controlling the robot cleaner, and more particularly, to a robot cleaner and a robot cleaning system capable of recognizing a current position of the robot cleaner by making use of an image photographed while the cleaner travels and a position recognition method.

BACKGROUND OF THE INVENTION

A typical robot cleaner determines an area to be cleaned by using an ultrasonic wave sensor disposed in its body while traveling along an outline of the area to be cleaned that is enclosed by a wall or an obstacle, and plans a cleaning course to clean the area to be cleaned. Next, the robot cleaner calculates its running distance and current position based on a signal that is detected by a sensor that detects the number of revolutions per minute and the rotation angle of a wheel of the robot cleaner. The robot cleaner drives the wheel to travel along the planned cleaning course. However, in such a position recognition method, errors can occur between the calculated running distance and current position obtained based on the signal detected by the sensor, and the actual running distance and position. The error is generated by a slip of the wheel or an uneven surface of the area to be cleaned. As the robot cleaner travels, the position recognition error accumulates. Therefore, the robot cleaner may deviate from the planned cleaning course due to the accumulated position recognition error. As a result, there is an occasion where some of the area to be cleaned remains unclean, or the same area is repeatedly cleaned. Accordingly, the working efficiency of the robot cleaner deteriorates.

SUMMARY OF THE INVENTION

The present invention has been developed in order to solve the above problems found in the prior art. Accordingly, an object of the present invention is to provide a robot cleaner and a robot cleaning system capable of efficiently performing a given amount of work by recognizing a current position of the robot cleaner more accurately, and by using a position recognition method.

The above object is accomplished by providing a robot cleaner that performs cleaning in wireless communication with an external device comprising a drive unit for driving a plurality of wheels; a camera disposed in a body for photographing an upper image extending perpendicular to a running direction of the robot cleaner; a controller for recognizing a position of the robot cleaner by using an upper camera to photograph position information comprising a recognition mark formed on a ceiling of a working area, and controlling the drive unit by using the recognized position information to correspond to a target cleaning operation.

At least two recognition marks are formed apart from each other, and the controller recognizes the current position by comparing coordinate information of the recognition mark appearing in a current image photographed by the upper camera with coordinate information previously memorized by the upper camera.

Preferably, the recognition marks respectively have different shapes which are distinguishable from each other, and are formed in black.

According to another aspect of the present invention, the recognition mark has a plurality of direction indicating portions integrally formed therewith, the direction indicating portions formed in an azimuthal direction from a predetermined center point and having different lengths.

Also, the above object is accomplished by providing a robot cleaning system comprising a robot cleaner comprising a drive unit for driving a plurality of wheels and an upper camera disposed in a body for photographing an upper image extending perpendicular to a running direction of the robot cleaner; and a remote controller communicating with the robot cleaner wirelessly, the remote controller recognizing a current position of the robot cleaner by using an upper camera to photograph image information comprising a recognition mark formed on a ceiling of a working area, and controlling a working course of the robot cleaner to perform a target cleaning operation based on the recognized current position.

Also, the above object is accomplished by providing a method of controlling a robot cleaner having an upper camera, comprising the steps of: storing an initial position value of a recognition mark appearing in an upper image photographed by the upper camera when a working command signal is inputted; calculating a running course to a target working position; traveling the robot cleaner in accordance with the calculated running course; and adjusting the running course by comparing the initial position value of the recognition mark with a position value of a recognition mark appearing in an upper image currently photographed by the upper camera.

BRIEF DESCRIPTION OF THE DRAWINGS

The present invention will be described in detail with reference to the following drawings, in which.

DESCRIPTION OF THE PREFERRED EMBODIMENT

Figure 1:
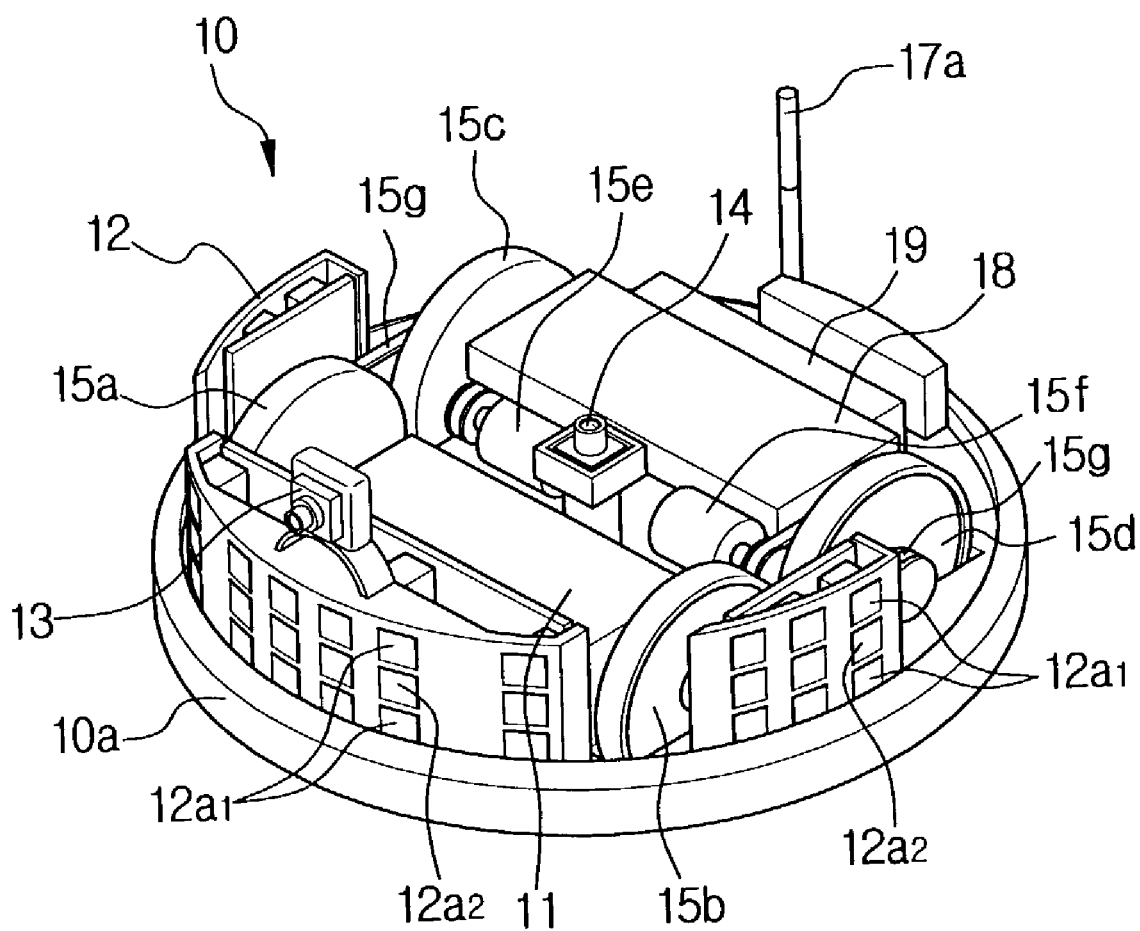
FIG. 1 is a perspective view showing a robot cleaner according to the present invention, from which a cover is separated.
Figure 2:
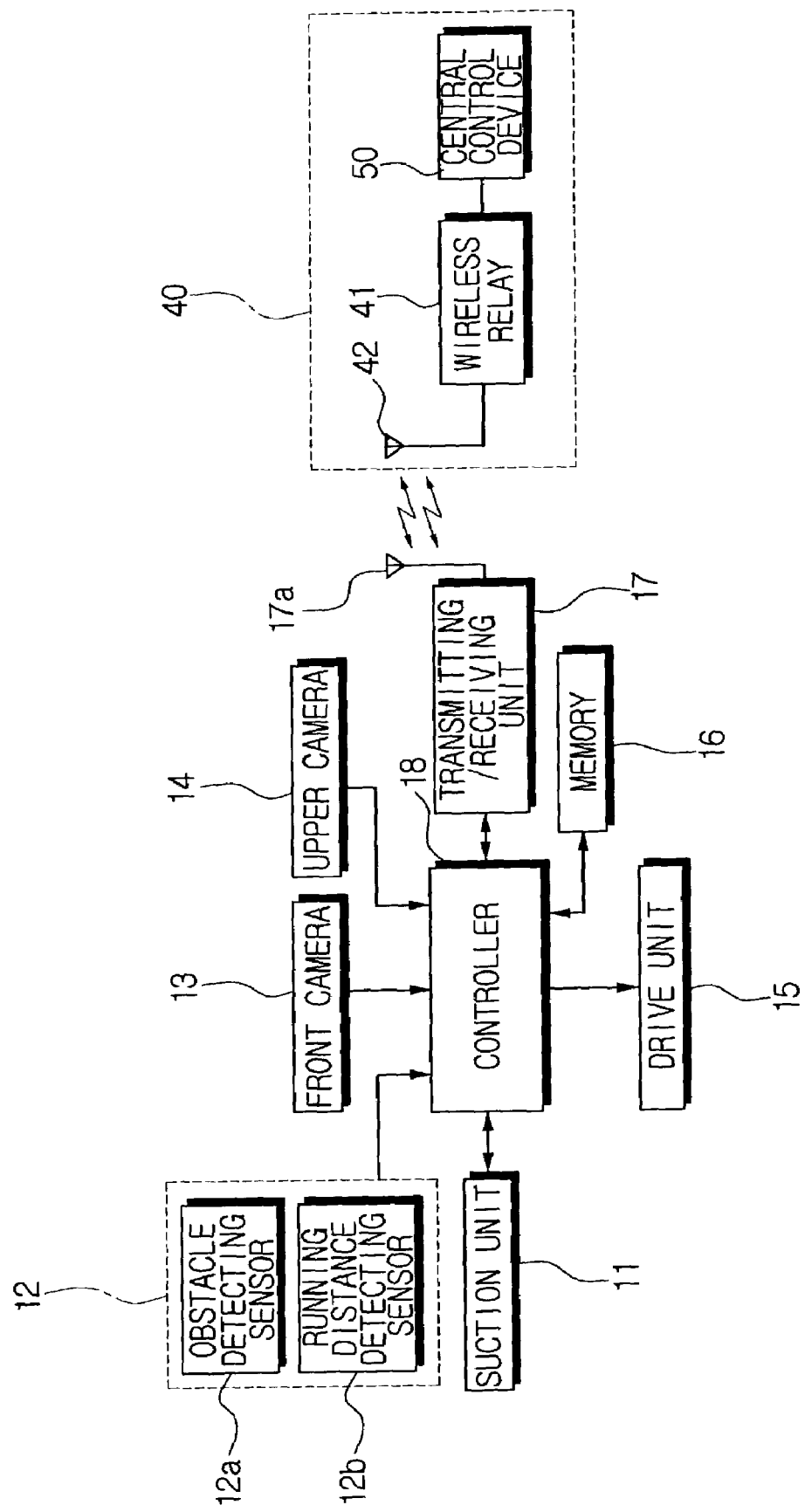
FIG. 2 is a block diagram showing a robot cleaning system according to the present invention.

FIG. 1 is a perspective view showing a robot cleaner according to the present invention, from which a cover is separated. FIG. 2 is a block diagram showing a robot cleaning system according to the present invention.

Referring to FIGS. 1 and 2, a robot cleaner 10 comprises a suction unit 11, a sensor 12, a front camera 13, an upper camera 14, a drive unit 15, a memory 16, a transmitting/receiving unit 17, and a controller 18. The reference numeral 19 indicates a battery.

The suction unit 11 is disposed in a body 10a, and draws air therethrough to collect the dust from an opposite cleaning surface. The suction unit 11 is constructed by various methods that will become known. For example, the suction unit 11 comprises a suction motor (not shown) and a dust-collecting chamber for collecting the dust, which is drawn in through a suction port or a suction pipe opposed to the cleaning surface, by the driving of the motor.

The sensor 12 comprises an obstacle detecting sensor 12a disposed along a circumference of the body 10a, for externally transmitting a signal and receiving a reflected signal, and a running distance detecting sensor 12b for measuring a running distance of robot cleaner 10.

The obstacle detecting sensor 12a has an infrared ray emitting element 12a1 for emitting an infrared ray and a light receiving element 12a2 for receiving a reflected light. A plurality of the infrared ray emitting elements 12a1 and the light receiving elements 12a2 are arranged in parallel vertical lines along the external circumference of the body 10a. Alternatively, the obstacle detecting sensor 12a may employ an ultrasonic wave sensor for emitting an ultrasonic wave and receiving a reflected ultrasonic wave. The obstacle detecting sensor 12a measures a distance to an obstacle or wall.

The running distance detecting sensor 12b may be a rotation detecting sensor for detecting a RPM of wheels 15a through 15d. For example, the rotation detecting sensor employs an encoder to detect the RPM of the motors 15e and 15f.

The front camera 13 is disposed in the body 10a, for photographing a front image and outputting the photographed front image to the controller 18.

The upper camera 14 is disposed in the body 10a, for photographing an upper image and outputting the photographed upper image to the controller 18. Preferably, the upper camera 14 uses a fisheye lens (not shown).

The fisheye lens comprises at least one lens that is designed to make a photographed view look as wide as a fisheye, for example, to the extent of 180°. The fisheye lens is designed to correspond to a desired degree of view angle or a permitted amount of distortion. Since the fisheye lens as constructed above is disclosed in Korean Patent Nos. 1996-7005245, 1997-48669 and 1994-22112 and marketed by several lens manufacturers, further detailed descriptions will not be provided.

The drive unit 15 comprises two front wheels 15a and 15b disposed at both front sides of body 10a, two rear wheels 15c and 15d disposed at both rear sides of body 10a, motors 15e and 15f respectively rotating the two rear wheels 15c and 15d, and a timing belt 15g for transferring a driving force from the rear wheels 15c and 15d to the front wheels 15a and 15b. The drive unit 15 rotates the respective motors 15e and 15f independently in clockwise/counter-clockwise directions in accordance with a control signal from controller 18. The change of the direction of robot cleaner 10 is made by rotating the motors 15e and 15f at different RPMs.

The transmitting/receiving unit 17 transmits and receives a signal through an antenna 17a and outputs the received signal to the controller 18.

The controller 18 processes the signal that is received through the transmitting/receiving unit 17 and controls the respective components of robot cleaner 10. Robot cleaner 10 may further comprise a key input apparatus (not shown) positioned in the body 10a and having a plurality of keys for manipulating a function of the robot cleaner, and in such a case, the controller 18 processes a key signal inputted through the key input apparatus (not shown).

The controller 18 recognizes a current position of the robot cleaner by using position information in the form of a recognition mark 31 (Refer to FIG. 3) appearing in an upper image photographed by the upper camera 14. The recognition mark 31 is formed on a ceiling of the area to be cleaned for use in the position recognition method. The controller 18 controls the respective components of robot cleaner 10 by using the recognized position information to perform assigned operations.

Reference image information is stored in the memory 16 for comparison with the recognition mark 31 of the photographed upper image so that the controller 18 searches the recognition mark 31 in the image photographed by the upper camera 14.

There are various image processing methods to discriminate the recognition mark 31 from the photographed image. In one example, the photographed image is converted into a grayscale, and is compared to an area connecting pixel points having a value similar to that of the recognition mark. In another example, image data distribution about the recognition mark is previously memorized, and any image area having a distribution similar to the memorized data value is determined to be the recognition mark.

The recognition mark 31 can be formed in various shapes that make it easy to measure a moving direction and moving distance of the robot cleaner 10.

Figure 3:
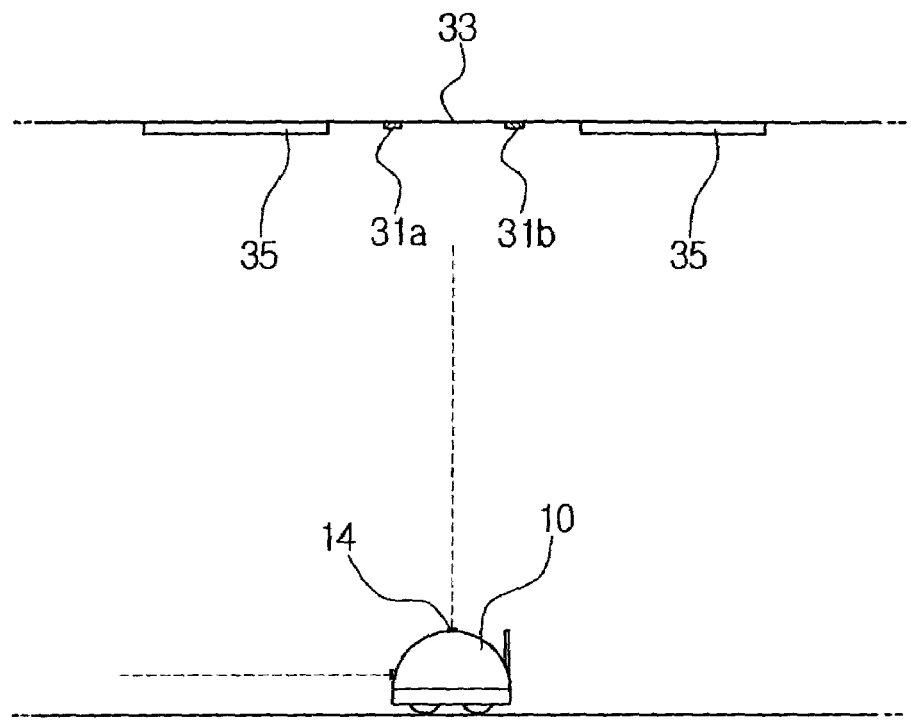
FIG. 3 is a view showing the robot cleaner of FIG. 1 being placed in a room.

FIG. 3 shows a working space in which an example of the recognition mark is formed.

Referring to FIG. 3, there are two recognition marks 31a and 31b formed on a ceiling 33 of the working space. The reference numeral 35 indicates a flourescent light.

Figure 4:
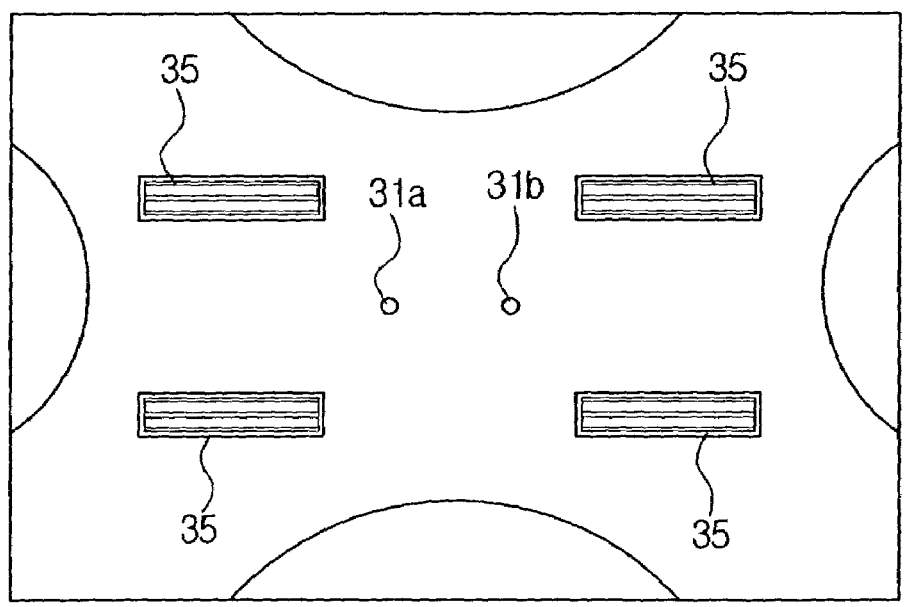
FIG. 4 is a view showing an image of a ceiling photographed by an upper camera.

FIG. 4 shows an example of an adjusted image of the upper area where the recognition mark 31 is formed, based on the original image photographed by the upper camera 14 employing the fisheye lens. The original image photographed by the fisheye lens is distorted and looks like a mapped image on a hemisphere, and adjustments are required to produce a linear shape to correspond to the actual space.

Accordingly, it is preferable that an image adjustment processing unit (not shown) is provided in the controller 18, or in the memory 17, and is activated by the controller 18.

The image adjustment processing unit adjusts the distorted image from the hemispherical shape to the linear shape in various methods that will become known. For example, Korean Patent No. 163915 discloses a method of compensating a distortion rate by applying a counter-weight corresponding to the distortion rate of the fisheye lens to a received image. Other known methods for compensating the distortion rate can also be employed.

Meanwhile, in order to recognize the current position of robot cleaner 10, the controller 18 calculates the amount of the position variance by comparing current information obtained by the upper camera 14, i.e., coordinate information regarding the recognition marks 31, the slope of a line connecting the recognition marks 31, and information regarding the distance between the recognition marks 31, to previously memorized information obtained by the upper camera 14.

The descriptions will be made in more detail with reference to FIG. 5.

Figure 5:
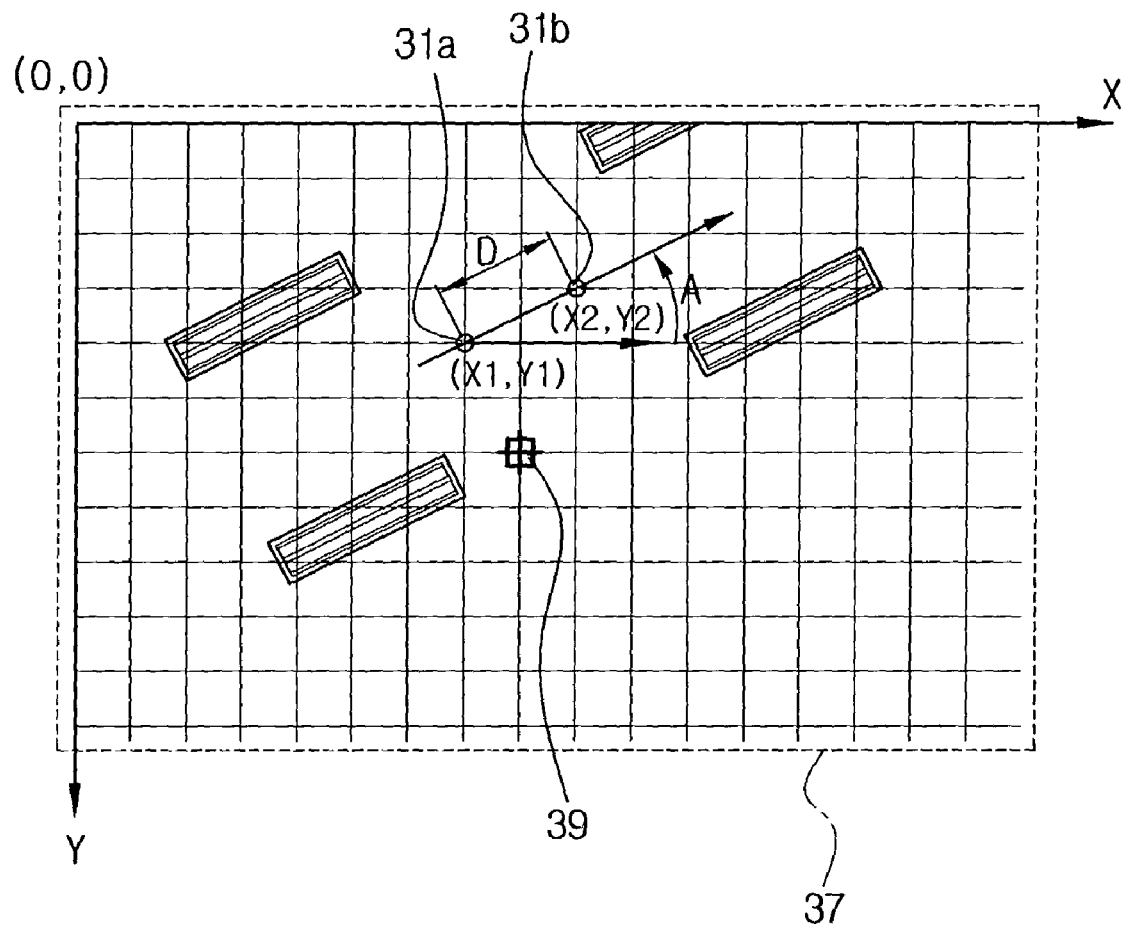
FIG. 5 is a view illustrating a process of calculating a position of a robot cleaner by using position information of an image of the recognition mark of FIG. 3.

FIG. 5 shows a whole screen 37 of the adjusted image based on the original image photographed by the upper camera 14. As shown, the coordinates with orthogonal axes (X, Y) and origin (0, 0) are applied to the whole screen 37 in order to explain a process of obtaining the coordinate values and the other parameters of a certain image in the whole screen 37. A mark designated by the reference numeral 39 in FIG. 5 indicates a central position of the upper camera 14 and corresponds to the current position of the robot cleaner 10.

As understood through the drawings, the controller 18 calculates the amount of the position variance and the current position by comparing coordinates (X1, Y1) and (X2, Y2) of the recognition marks 31a and 31b appearing in the image photographed by the upper camera 14, a distance D between the coordinates, and angle (A) data that corresponds to a slope of a line connecting the recognition marks 31a and 31b with previously memorized data.

Preferably, the recognition marks 31 have different shapes that are distinguishable from each other.

Also, in consideration of the light emitted from lamps and generally bright interiors of the cleaning space, the recognition marks 31 are formed in black to be easily distinguished.

Figure 6:
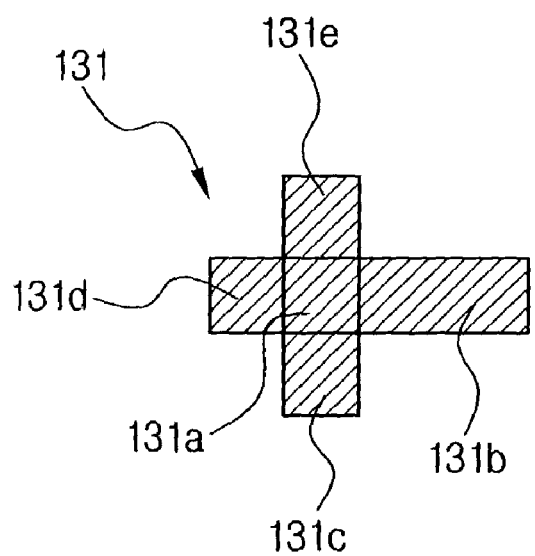
FIG. 6 is a bottom view showing a recognition mark according to another embodiment of the present invention.

Also, instead of using the two recognition marks 31a, 31b, an integrally formed recognition mark 131 can be employed, which is shown in FIG. 6. The integrally formed recognition mark 131 has four direction indicating portions 131b, 131c, 131d, and 131e that extend from a central portion 131a in the four cardinal directions. The direction indicating portions 131b and 131d respectively extend from the central portion 131a in opposite horizontal directions with different lengths. The integrally formed recognition mark 131 allows the controller 18 to easily obtain the information on the direction of rotation and moving distance of robot cleaner 10 by comparing the currently photographed image with the previously photographed image. One of the four direction indicating portions 131b, 131c, 131d, and 131e can be omitted.

When a work demand signal is wirelessly inputted through the key input apparatus from outside, the controller 18 recognizes the current position of the robot cleaner 10 by comparing the position information of the recognition mark 31 appearing in the image currently photographed by the upper camera 14 with the previously memorized recognition mark. Then, the controller 18 drives the drive unit 15 to correspond to a target running course starting from the recognized current position. At this point, the work demand signal includes a command to perform a cleaning operation, or a monitoring operation through a camera. While moving along the target running course, the controller 18 calculates a running error by using a running distance measured by the encoder and the current position of the robot cleaner recognized by comparing the position information of the recognition mark 31 appearing in the image currently photographed with the position information of the previously memorized recognition mark. Then, the controller 18 compensates for the running error and controls the drive unit 15 to track the target running course. Also, if the recognition mark 31 is not captured while the cleaner passes over an obstacle, the controller 18 temporarily controls the running of the cleaner by using the information on the running distance and running direction calculated from the encoder.

In the above descriptions, the controller 18 directly performs a position recognition process by using the image information of the recognition mark 31 photographed by the upper camera 14.

According to another aspect of the present invention, a robot cleaner system performs a position recognition process for the robot cleaner through an external device, such that a calculation load needed to recognize the position is reduced.

For this, robot cleaner 10 wirelessly transmits photographed image information to an external device and is operated according to a control signal received from the external device. As seen in FIG. 2, a remote controller 40 controls a running of the robot cleaner 10 by controlling a driving of the robot cleaner wirelessly. The remote controller 40 comprises a wireless relay 41 and a central control device 50.

The wireless relay 41 processes a wireless signal received from the robot cleaner 10 via an antenna 42, and transmits the signal to the central control device 50 through a wire. The wireless relay 41 transmits a signal received from the central control device 50 to the robot cleaner 10 wirelessly via antenna 42.

Figure 7:
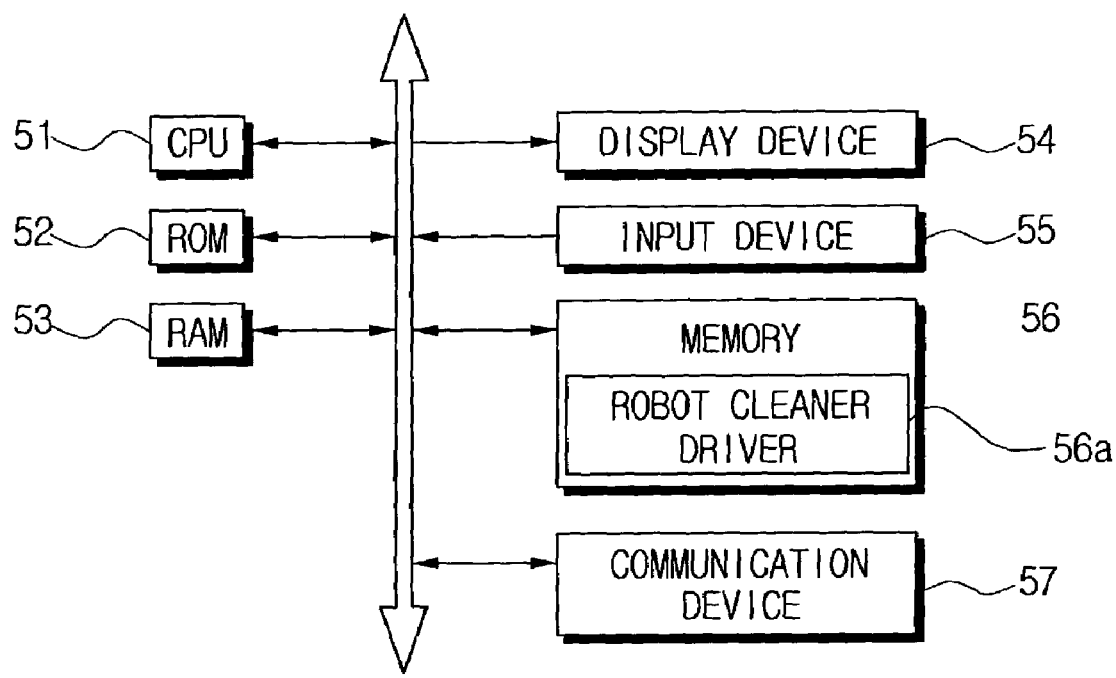
FIG. 7 is a block diagram showing a central control apparatus of FIG. 2.

The central control device 50 is constructed with a general computer, an example of which is shown in FIG. 7. Referring to FIG. 7, the central control device 50 comprises a central processing unit (CPU) 51, a read only memory (ROM) 52, a random access memory (RAM) 53, a display device 54, an input device 55, a memory device 56, and a communication device 57.

The memory 56 is provided with a robot cleaner driver 56a for controlling the robot cleaner 10 and processing the signal received from the robot cleaner 10. If the robot cleaner driver 56a is activated, a menu for the setting of robot cleaner control is displayed on the display device 54. The robot cleaner driver 56a processes a menu selection made by the user and controls the robot cleaner 10 in accordance with the user's selection. The menu provides a main menu including a cleaning operation and a monitoring operation, and a sub-menu including a target area selection list and a working mode.

The robot cleaner driver 56a recognizes the current position of the robot cleaner 10 in the same method as described above, i.e., using an upper image of a recognition mark received from the robot cleaner 10 and a memorized image of the recognition mark.

The controller 18 of the robot cleaner 10 controls the drive unit 15 according to control information received from the robot cleaner driver 56a through the wireless relay 41, and reduces the calculation load needed to recognize the position of robot cleaner 10. Also, during the running of robot cleaner 10, the controller 18 periodically transmits the photographed upper image to the central control device 50 through the wireless relay 41.

Figure 8:
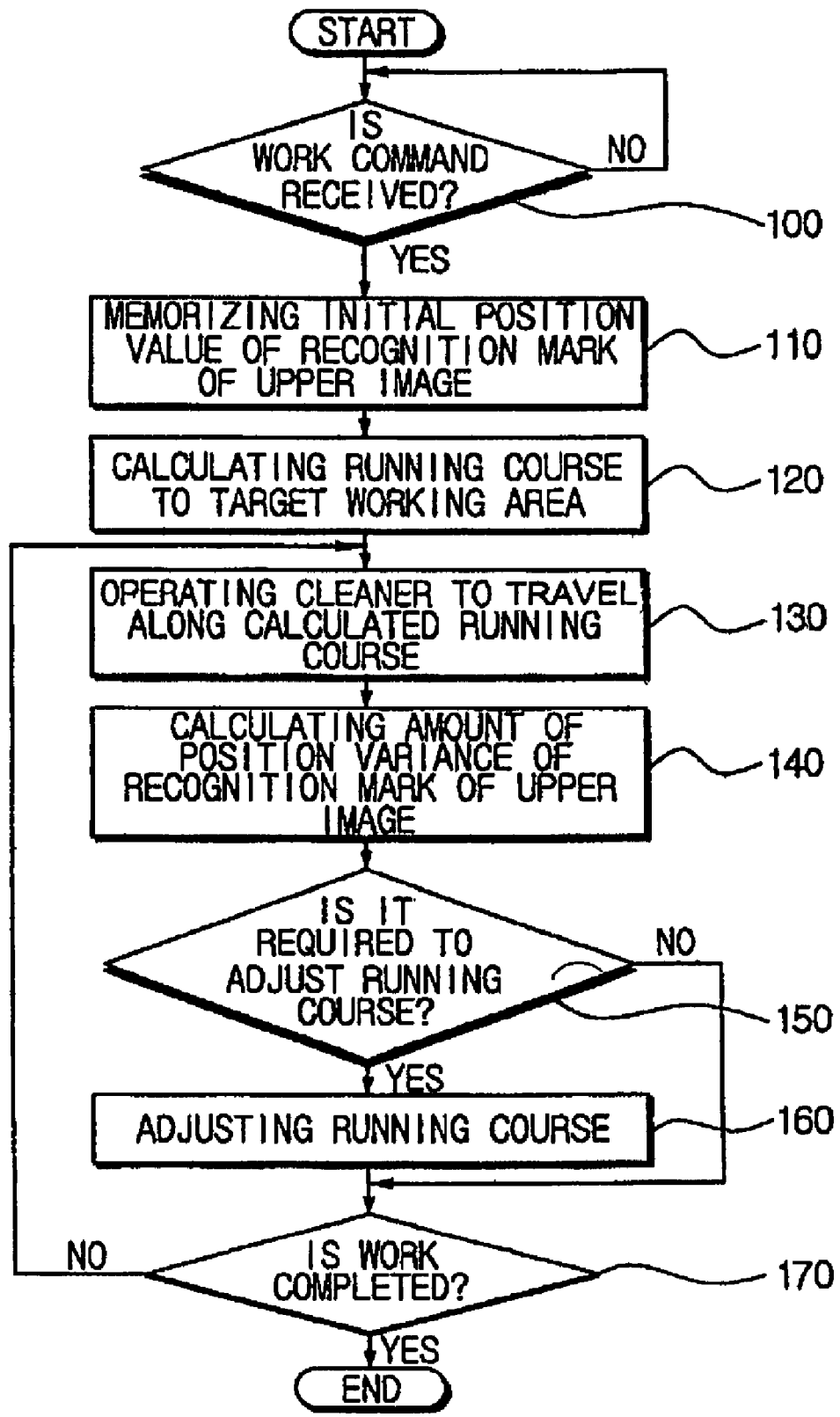
FIG. 8 is a flow chart showing a cleaning operation of a robot cleaner according to the present invention.

Hereinafter a method of controlling the robot cleaner will be described in greater detail with reference to FIG. 8. Initially, it is determined whether a work command is received (Step 100). If the work command is received, an initial position value of the recognition mark appearing in an upper image photographed by the upper camera 14 is memorized (Step 110). After that, a target working area corresponding to the received work command, or a running course along which robot cleaner 10 travels to the target working area is calculated (Step 120). Then, the robot cleaner 10 is operated to travel along the calculated running course (Step 130).

During the running of robot cleaner 10, the amount of the position variance of robot cleaner 10 is calculated by comparing the position information of the recognition mark appearing in the upper image received from the upper camera 14 with the memorized initial position value (Step 140). It is then determined whether the running course of robot cleaner 10 requires adjustment by analyzing the calculated amount of the position variance (Step 150). If a running course adjustment is required, the running course is adjusted by using the recognized current position information (Step 160). Then, it is determined whether the work is completed (Step 170). The 'work' means a cleaning operation that is performed by the robot cleaner while moving to the target area and traveling along the running course. If it is determined that the work is not completed, then steps 130 through 170 are repeated until the work is completed.

As described above, according to the robot cleaner and the robot cleaning system and the method of controlling thereof according to the present invention, since the recognition mark for the recognition of current position of the robot cleaner is formed on a ceiling that has a few changes, the position recognition is performed with more accuracy and the traveling of robot cleaner 10 to the target work area and the cleaning operation is performed efficiently.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A robot cleaner for performing a cleaning operation comprising:
   a drive unit for driving a plurality of wheels;
   a camera disposed in the body; and
   a controller programmed to recognize a position of the drive unit using position information obtained from a recognition mark on a ceiling of a working area that is photographed by the camera, and controlling the drive unit by using the recognized position information to correspond to a target cleaning operation,
   wherein the recognition mark has a plurality of direction indicating portions integrally formed therewith, the direction indicating portions formed in an azimuthal direction from a predetermined center point of the recognition mark and having different lengths.

2. The robot cleaner of claim 1, wherein the drive unit comprises a pair of motors and a pair of belts, each motor connected to a rear wheel, and each belt wrapped around both a rear wheel and a front wheel.

3. A robot cleaning system comprising:
   a robot cleaner comprising
      a drive unit for driving a plurality of wheels;
      an upper camera disposed in the body, for photographing an upper image extending perpendicular to a running direction of the robot cleaner; and
   a remote controller in wireless communication with the robot cleaner programmed to recognize a current position of the robot cleaner by using an image of a recognition mark formed on a ceiling of a working area that is photographed by the upper camera, and controlling a working course of the robot cleaner to perform a target cleaning operation based on a recognized current position of the robot cleaner,
   wherein the recognition mark has a plurality of direction indicating portions integrally formed therewith, the direction indicating portions formed in an azimuthal direction from a predetermined center point of the recognition mark and lengths that are different from one another.

4. The robot cleaning system of claim 3, wherein the recognition mark is formed in black.

5. The robot cleaning system of claim 3, further comprising a front camera to photograph an area in front of the robot cleaner.

6. The robot cleaning system of claim 3, further comprising a transmitting and receiving unit to send signals to and receive signals from the remote controller.

7. The robot cleaning system of claim 3, wherein the drive unit comprises a pair of motors and a pair of belts, each motor connected to a rear wheel, and each belt wrapped around both a rear wheel and a front wheel.

8. A robot cleaner comprising, in combination:
   a body;
   a suction unit;
   a plurality of wheels;
   a drive unit connected to the wheels;
   an obstacle detecting sensor positioned on the body;
   a running distance detecting sensor positioned on the body;
   a camera configured to photograph a recognition mark formed on a ceiling of an area to be cleaned;
   a controller configured to send a signal to the drive unit and programmed to recognize a position of the robot cleaner based on a comparison of a current photograph of the recognition mark and a stored photograph of the recognition mark,
   wherein the recognition mark has a plurality of direction indicating portions integrally formed therewith, the direction indicating portions formed in an azimuthal direction from a predetermined center point of the recognition mark and having different lengths.

9. The robot cleaner of claim 8, wherein the obstacle detecting sensor comprises at least one infrared ray emitting element and at least one light receiving element.

10. The robot cleaner of claim 8, wherein the running distance detector comprises a rotation detecting sensor configured to detect a number of revolutions per minute of the plurality of wheels.

* * * * *